United States Patent [19]

Odlen

[11] Patent Number: 4,894,645

[45] Date of Patent: Jan. 16, 1990

[54] INCANDESCENT MATRIX DISPLAY WITH HIGH FREQUENCY LAMP DRIVING

[75] Inventor: Lars B. G. Odlen, Stockholm, Sweden

[73] Assignee: Prisma Skyltreklam AB, Sweden

[21] Appl. No.: 199,527

[22] Filed: May 27, 1988

[30] Foreign Application Priority Data

Jun. 3, 1987 [SE] Sweden .......................... 87023073

[51] Int. Cl.[4] .......................... G09F 9/32; H04N 3/12

[52] U.S. Cl. .................................... 340/780; 358/240; 315/161; 315/316; 315/317

[58] Field of Search .................. 358/240, 60; 340/780, 340/793; 315/161, 312, 314–320, 201, 205

[56] References Cited

U.S. PATENT DOCUMENTS

| | | | |
|---|---|---|---|
| 4,063,234 | 12/1977 | Arn et al. | 358/240 X |
| 4,283,659 | 8/1981 | Beckerman et al. | 340/780 X |
| 4,488,090 | 12/1984 | Hancock | 315/201 |
| 4,559,480 | 12/1985 | Nobs | 358/240 X |
| 4,688,154 | 8/1987 | Nilssen | 315/312 X |
| 4,745,537 | 5/1988 | Cheung | 315/205 |
| 4,771,278 | 9/1988 | Pooley | 358/240 X |
| 4,820,956 | 4/1989 | Slobodzian et al. | 340/780 X |

*Primary Examiner*—James J. Groody
*Assistant Examiner*—Mark R. Powell
*Attorney, Agent, or Firm*—Tarolli, Sundheim & Covell

[57] ABSTRACT

The present invention relates to an electronic sign with a number of light bulbs provided in rows and columns (so called matrix), whereby said bulbs (L) are turned on row by row or column by column (so called multiplex operation). For increasing the life of the bulbs (L), said bulbs (L) are operated by alternating current at high frequency.

4 Claims, 3 Drawing Sheets

INCANDESCENT MATRIX DISPLAY WITH HIGH FREQUENCY LAMP DRIVING

The present invention relates to an electronic sign with a number of light bulbs provided in rows and columns (i.e., a matrix), whereby the light bulbs are turned on row by row or column by column (so called multiplex operation).

At most electronic signs, direct driving is used, which means that a coupling element is required for each lamp. Since an electronic sign may comprise many thousand bulbs, direct driving requires many thousand coupling elements and the gain is substantial if this amount of coupling elements can be spared. This is possible if the bulbs instead can be operated in groups (e.g., multiplex operation). Such operation in groups is utilized in connection with direct-current operation, which however causes problems with migration of material in the filaments of the light bulbs, which substantially reduces the life of said light bulbs.

The object of the present invention has been to eliminate said drawbacks and this is accomplished substantially by means of the characteristic features of claim 1.

Since the light bulbs in accordance with said features are operated with high frequency alternating current, the life of said light bulbs is substantially increased compared with direct-current operation while at the same time the advantages associated with direct-current operation are maintained.

the invention will further be described below with reference to the accompanying drawings in which FIG. 1 is a simplified block diagram over the alternating-current driving of the electronic sign;

Figure 1:
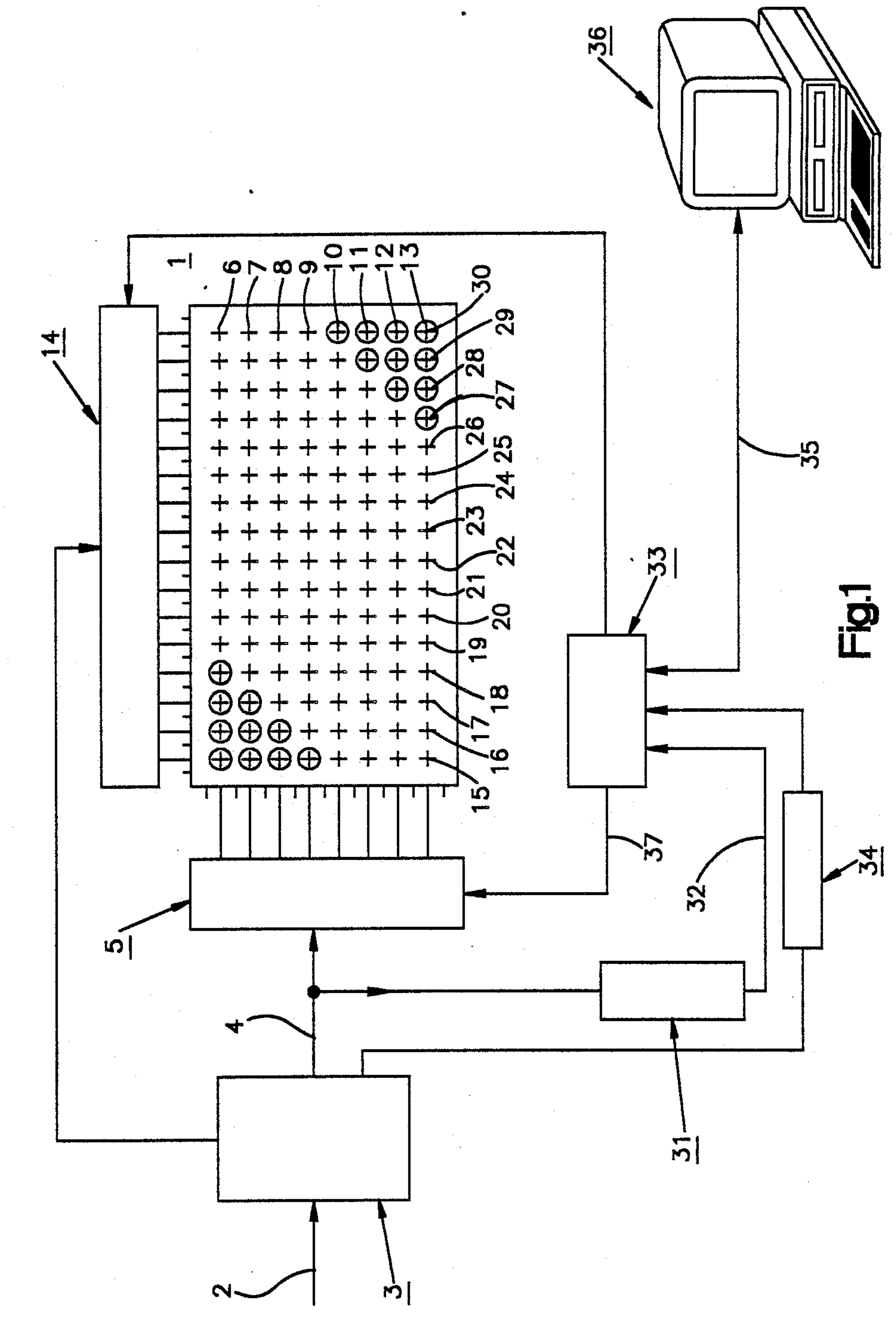

FIG. 1 is a block diagram for alternating-current (A.C.) operation of a multiplex light bulb matrix 1, while the A.C. operation occurs via diode and transistor matrix. In the block diagram reference numeral 2 indicated incoming mains voltage (220 V, 50 Hz), 3 a switched mains unit (40 V, 8 A), 4 high-frequency A.C. current (>20 KHz), 5 a row driver (driver for eight rows of bulbs 6–13), 14 a column driver (driver for sixteen columns of bulbs 15–30), and 31 a synchronizing unit for generating synchronizing pulses 32 to a logic unit 33. For current measurement, the switched mains unit 3 is connected to the logic unit 33 via a current meter 34 (this is shown in more detail in FIG. 4) and the logic unit 33 is connected 35 to a superior control unit 36, connected 37 to the row driver 5 and connected 38 to the column driver 14.

With this A.C. driving device the mains voltage 2 is rectified and chopped up to 20–30 KHz by means of semi-conductor elements. The high-frequency pulses thus obtained are fed to the primary winding in a ferrite transformer which also includes a secondary winding for power supply to the logic circuits. The secondary side of the transformer generates high-frequency A.C. 4 with about 40 V, 8 A as maximum amplitude, and this A.C. is fed to the bulb matrix 1 via the row and column drivers.

The current of the secondary side is measured as the voltage drop across a resistor connected in series with the winding. These pulses of current are fed to a number of comparators on the logic unit 33.

Figure 3:
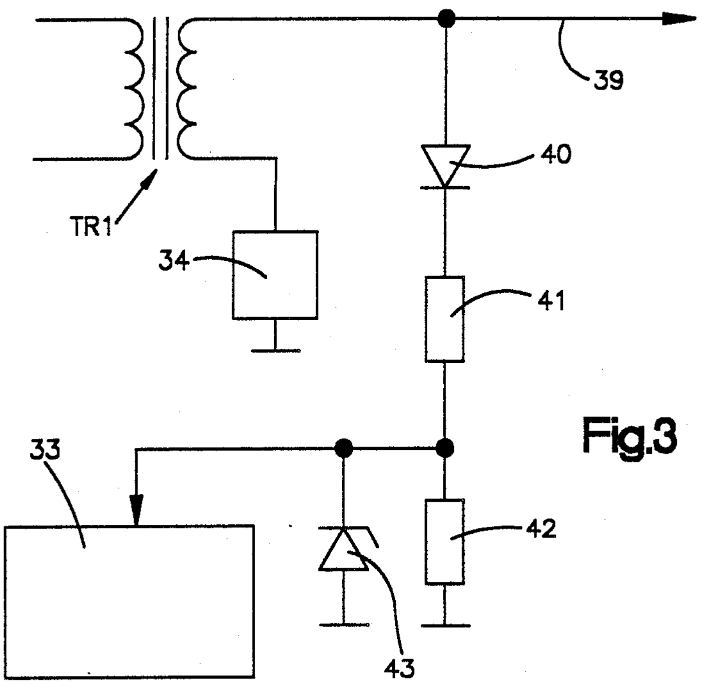
FIG. 3 is a block diagram illustrating synchronizing of row and column shifting at the alternating-current operation.

The positive half-period of the secondary voltage generates synchronizing pulses to the logic unit (see FIG. 3).

The superior control unit 36, which preferably is a type of programmable unit (computer), send signals on an eight bit parallelous including information about which bulbs L in the bulb matrix 1 that should be lit in the sign. On this data bus, the logic unit may present information of the number of defective bulbs L in each column 15–30 (see FIG. 4 and the corresponding text).

Figure 2:
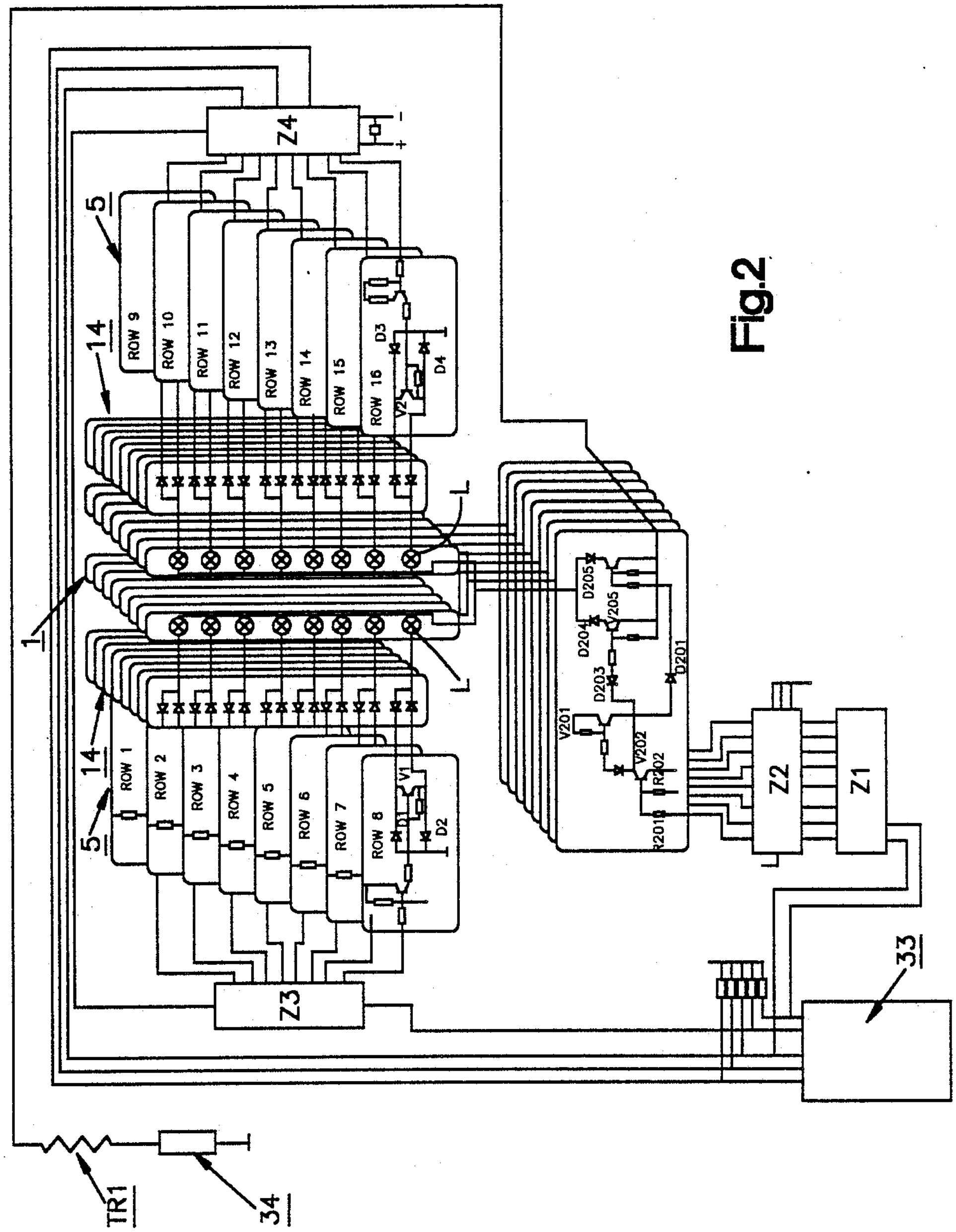
FIG. 2 is a more detailed block diagram over said alternating-current driving of the electronic sign.

In FIG. 2 the members illustrated in the block diagram of FIG. 1 are shown in more detail. Thus, the alternating voltage is fed from the transformer to the eight different column drivers. In the column drivers, denoted COL 1–16 in FIG. 2, the voltage is divided into a negative and a positive component by means of the diodes D204 and D205. When the transistors conduct, the current will flow to the column hereby addressed. The diodes D201 and D203, resistors R201 and R208 and transistors V201 and V202 generate the required operating current to the bases on V203 and V204 and are therefore not further explained here. The other end of the column of bulbs, the common driving of rows towards earth, is taken care of by means of the sixteen row driver blocks, denoted ROW 1–16 in the figure.

the voltage is here also separated into a negative and a positive portion by means of the diode matrix D207–D238. Along with the sixteen transistors V1–V16 and the thirtytwo diodes D1–D16, a full-wave bridge is defined, which can be short-circuited by the transistors and thereby earth the current.

The transistors V1–V16 and the surround resistors function as drivers for the base current to the transistors V1–V16 according to the above.

The row drivers ROW 1–16 are structurally more simple while they functionally are related to earth.

Control signals to the row drivers ROW 1–16 are obtained from the outputs of two SIPO shift registers, Z3 and Z4, which are fed from the logic unit 33. Low signal represents a lit bulb L.

the control signals for the column drivers COL 1–16 are obtained from the counter circuit Z1 via the buffer circuit Z2. The counter Z1 is stepped for each new addressing latch pulse of the row driver shift registers Z3, Z4. When the multiplex turn is completed and thus, all eight columns have been activated, a resetting pulse is fed from the logic unit 33 to the counter Z1. Hereby, the counter Z1 is reset to activate the first column and the procedure can start from the beginning.

Synchronizing the row and column shifting of the logic unit relative to the waveform of the switched mains unit occurs as follows:

In order to give the same available amount of energy to the various columns at multiplex operation, and in order to provide zero through switching of the load, the row and column shifting of the logic unit is synchronized with the waveform of the switched mains unit.

This is accomplished according to FIG. 3 while the output voltage from the secondary side of the transformer TR1 is half-wave rectified in the diode 40. The voltage is reduced to about 5 V amplitude in the voltage divider 41 and 42. The diode 43 functions as a clamp and protective diode for over and under voltage transients. The signal is fed to a schmitt trigger input at the logic unit 33 where synchronizing occurs by stepping a counter function.

The connection 39 is intended to feed A.C. to the column driver 14.

Figure 4:
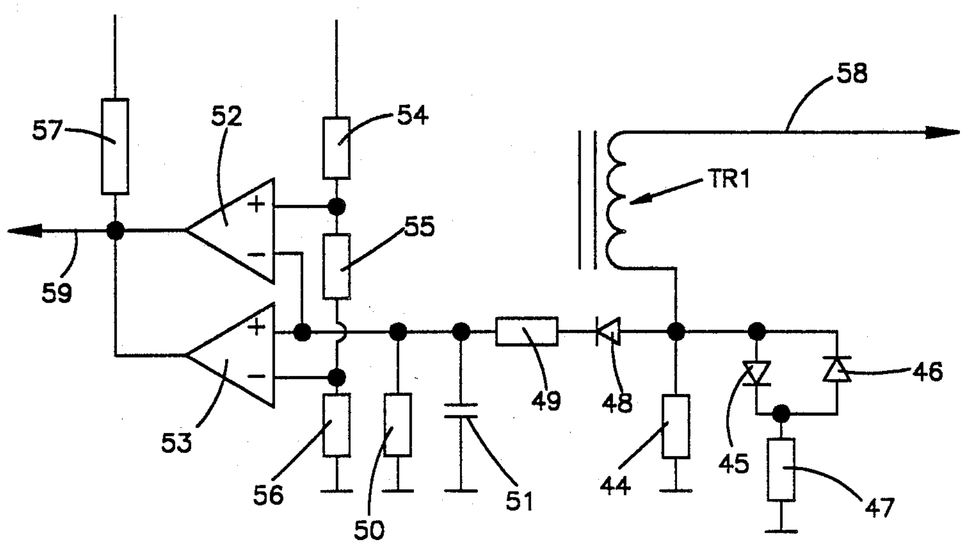
FIG. 4 is a block diagram illustrating current measurement at the alternating-current operation.

Registration of malfunctions in bulbs L, etc. may be carried out as follows:

The current from the transformer TR1 is measured in such a way that one pole of the transformer is connected to earth via a low-ohmic resistor 44 (see FIG. 4). The voltage across this resistor 44 will then represent the current flowing through the winding of the transformer TR1. Since the current intensities are high, the power dissipation across the resistor 44 at full load will be substantial. Therefore, the resistor 44 is shunted by anti-parallel diodes 45 and 46, which connects the current via the morelow-ohmic resistor 47.

The diodes 45, 46 are silicon diodes which provide a shunt voltage of 0,6–0,8 V. The diode 48 of shottky type has a less voltage drop and will conduct at voltages corresponding to the current intensity for a lit bulb L in the selected column.

The resistance net 49 and 50 voltage divides to the desired voltage, whereafter the signal is low-pass filtered in the condenser 51. The circuits 52 and 53 are of open collector type and coupled as a window comparator. The resistors 54, 55 and 56 feed the threshold voltages to the other inputs of the window comparator. High signal level will be present at the output of the comparator with the pull up resistor 57 only when the current in the transformer TR1 corresponds with the load of a bulb L.

The connection 58 is intended to feed A.C. to the column driver 14 and the connection 59 to feed a signal if a bulb L is whole.

By feeding out a test pattern, the superior control unit 36, the purpose of which is to generate the desired sign information, may in this way, via the logic unit 33 present in each sign module, get information about the working condition of the bulbs L and the sign electronics.

This information may be utilized to initiate change of bulbs and other maintenance work.

In summary, it may be noted that with the device described above and shown in the drawings, the bulbs L are thus operated with alternating current, whereby their life is substantially increased in comparison to direct current operation, since the migration of material appearing at direct current operation in always the same direction from one side of the filaments to the other and thereby the breakage of filament in a short time is eliminated.

As is apparent from the above description, the frequency of the A.C. preferably substantially exceeds the mains frequency and the A.C. is preferably obtained from a so-called switched mains unit 3.

It is also apparent from above description that the row and column driving preferably is controlled by a logic unit 33 and the shifting of said row and column driving from the logic unit 33 is preferably synchronized with the waveform of the A.C. from the switched mains unit 3.

Finally, it should be mentioned that the logic unit 33 preferably may feed to a superior control unit 36 a signal based upon measuring of A.C. from the switched mains unit 3 representing the working condition of various components, e.g. defective bulbs L.

The invention is not limited to the embodiment described above and illustrated in the drawings, but may vary within the scope of the following claims.

I claim:

1. An electronic sign with a number of light bulbs provided in rows and columns, the bulbs being turned on either row-by-row or column-by-column, the electronic sign comprising:

a switched mains unit for receiving a mains voltage having a mains frequency and for providing an alternating current to operate the bulbs, the frequency of the alternating current substantially exceeding the mains frequency; and a logic unit for controlling the row and column operation, the shifting of the row and column operation being synchronized with the alternating current from the switched mains unit.

2. The electronic sign of claim 1 further including a superior unit for receiving a signal fed from said logic unit, the signal being based upon a measurement of the alternating current from said switched mains unit representing the operating or working condition of a number of components including the light bulbs.

3. An electronic sign with a number of light bulbs provided in rows and columns, the bulbs being turned on either row-by-row or column-by-column, the electronic sign comprising:

a switched mains unit for receiving a mains alternating current having a mains frequency and for providing an output alternating current of a frequency substantially exceeding the mains frequency to operate the bulbs;

control means for controlling the shifting of the row operation or the column operation of the bulbs, the shifting of the row operation or the column operation of the bulbs being synchronized with the waveform of the output alternating current from the switched mains unit.

4. The electronic sign of claim 3 wherein the control means includes a logic unit for providing a signal to control the shifting of the row operation or the column operation of the bulbs.

* * * * *